US012765716B2

(12) United States Patent
Zeng et al.

(10) Patent No.: US 12,765,716 B2
(45) Date of Patent: Oct. 20, 2026

(54) COOKWARE DETECTION CIRCUIT USING HALF-BRIDGE DRIVE HEATING, HEATING DEVICE, COOKWARE DETECTION METHOD, AND STORAGE MEDIUM

(71) Applicant: FOSHAN SHUNDE MIDEA ELECTRICAL HEATING APPLIANCES MANUFACTURING CO., LTD., Foshan (CN)

(72) Inventors: Lutian Zeng, Foshan (CN); Chengbin Zhu, Foshan (CN); Jun Lei, Foshan (CN); Deyong Jiang, Foshan (CN); Wenhua Liu, Foshan (CN); Yunfeng Wang, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 669 days.

(21) Appl. No.: 18/270,120

(22) PCT Filed: Dec. 20, 2021

(86) PCT No.: PCT/CN2021/139560
§ 371 (c)(1),
(2) Date: Jun. 28, 2023

(87) PCT Pub. No.: WO2022/143248
PCT Pub. Date: Jul. 7, 2022

(65) Prior Publication Data

US 2024/0057811 A1 Feb. 22, 2024

(30) Foreign Application Priority Data

Dec. 29, 2020 (CN) ........................ 202011593061.5

(51) Int. Cl.
*A47J 36/24* (2006.01)
*H05B 6/04* (2006.01)
(Continued)

(52) U.S. Cl.
CPC ............ *A47J 36/2483* (2013.01); *H05B 6/04* (2013.01); *H05B 6/062* (2013.01); *H05B 6/1245* (2013.01); *H05B 2213/05* (2013.01)

(58) Field of Classification Search
CPC .. A24J 36/2483; H05B 6/062; H05B 2213/05
See application file for complete search history.

(56) References Cited

U.S. PATENT DOCUMENTS

2007/0085517 A1* 4/2007 Ribarich .................. G05F 1/70 323/235
2008/0035609 A1* 2/2008 Kashkoush ........... H10P 50/283 216/84
(Continued)

FOREIGN PATENT DOCUMENTS

CN 101437333 A 5/2009
CN 101909375 A 12/2010
(Continued)

OTHER PUBLICATIONS

The World Intellectual Property Organization (WIPO) Written Opinion for PCT/CN2021/139560 Mar. 22, 2022 7 pages (including English translation).
(Continued)

*Primary Examiner* — Woody A Lee, Jr.
(74) *Attorney, Agent, or Firm* — Anova Law Group, PLLC

(57) ABSTRACT

A cookware detection circuit includes a control module configured to output a single pulse cookware detection signal to a half-bridge drive module of an electromagnetic heating device to drive a coil disk of the electromagnetic
(Continued)

heating device to perform a resonant operation through the half-bridge drive module, and a pulse detection module configured to be connected to the coil disk and detect a resonant current of the coil disk and generate one or more pulse signals based on the resonant current of the coil disk. The control module is connected to the pulse detection module, and is further configured to count the one or more pulse signals and determine whether cookware is placed on the electromagnetic heating device based on a number of the one or more pulse signals.

19 Claims, 5 Drawing Sheets

(51) Int. Cl.
*H05B 6/06* (2006.01)
*H05B 6/12* (2006.01)

(56) References Cited

U.S. PATENT DOCUMENTS

| | | | | |
|---|---|---|---|---|
| 2018/0063891 | A1* | 3/2018 | Imai | H05B 6/062 |
| 2019/0045586 | A1 | 2/2019 | Son et al. | |
| 2019/0104569 | A1 | 4/2019 | Moon et al. | |
| 2019/0124726 | A1 | 4/2019 | Moon et al. | |
| 2020/0154529 | A1* | 5/2020 | Kwack | H05B 6/062 |
| 2023/0239973 | A1* | 7/2023 | Kopiness | H05B 6/10 219/200 |

FOREIGN PATENT DOCUMENTS

| | | | | |
|---|---|---|---|---|
| CN | 103501555 | A | 1/2014 | |
| CN | 104754789 | A | 7/2015 | |
| CN | 204634072 | A | 9/2015 | |
| CN | 206585777 | U | 10/2017 | |
| CN | 107315198 | A | 11/2017 | |
| CN | 109324347 | A | 2/2019 | |
| CN | 109412534 | A | 3/2019 | |
| CN | 210717692 | U | 6/2020 | |
| CN | 111385930 | A | 7/2020 | |
| CN | 111901914 | A | 11/2020 | |
| EP | 3462813 | A1 * | 4/2019 | H05B 6/04 |

OTHER PUBLICATIONS

The China National Intellectual Property Administration (CNIPA) The Second Office Action for Chinese Application 202011593061.5, Jan. 23, 2024 14 Pages (With Translation).

The China National Intellectual Property Administration (CNIPA) The Rejection Decision for Chinese Application 202011593061.5, Apr. 23, 2024 11 Pages (With Translation).

The European Patent Office (EPO) Communication Pursuant to Rules 70(2) and 70a(2) EPC for Application No. 21913989.6, May 15, 2024 12 Pages.

The China National Intellectual Property Administration (CNIPA) The First Office Action for Chinese Application 202011593061.5, Aug. 9, 2023 21 Pages (With Translation).

Zhengwu Yao., "Thyristor Converter Equipment Supply Accurate Zero Crossing Detection Technology", Dec. 2014, pp. 1256-1260, vol. 37 No. 6, Chinia Academic Journal Electronic Publishing House.

The World Intellectual Property Organization (WIPO) International Search Report for PCT/CN2021/139560 Mar. 22, 2022 8 pages (including English translation).

* cited by examiner

COOKWARE DETECTION CIRCUIT USING HALF-BRIDGE DRIVE HEATING, HEATING DEVICE, COOKWARE DETECTION METHOD, AND STORAGE MEDIUM

CROSS-REFERENCE TO RELATED APPLICATION APPLICATIONS

The present application is a National Stage Entry under 35 U.S.C. § 371 of International Application No. PCT/CN2021/139560, filed on Dec. 20, 2021, which claims priority to Chinese Patent Application No. 202011593061.5, titled "COOKWARE DETECTION CIRCUIT USING HALF-BRIDGE DRIVE HEATING, HEATING DEVICE, COOKWARE DETECTION METHOD, AND STORAGE MEDIUM," and filed on Dec. 29, 2020, the entire contents of which are incorporated herein by reference.

FIELD

The present disclosure relates to home appliance technologies, and more particularly, to a cookware detection circuit using half-bridge drive heating for an electromagnetic heating device, an electromagnetic heating device, a cookware detection method for an electromagnetic heating device, a computer-readable storage medium, and an electromagnetic heating device.

BACKGROUND

In the related art, cookware detection method using half-bridge topology electromagnetic induction heating is generally adopted in an electromagnetic heating device. As illustrated in FIG. 1, each cookware detection cycle lasts about 1 second. Complementary Pulse Width Modulation (PWM) signals are continuously outputted from a pin PWM1 and a pin PWM 2 of a controller 500, and a switching transistor 602 and a switching transistor 603 are switched on and off alternately after the signals pass through a half-bridge drive core 601. A current flowing through a coil disk 604 is sampled by a current transformer 701, and then converted from a large current signal of tens of amperes into a small signal current of tens of milliamperes. Then, the small signal current is converted into a voltage signal of about 0 V to 5 V after flowing through a load resistor R2. Furthermore, the voltage signal is filtered by a filter circuit composed of a resistor 703 and a capacitor 704, and then is sent to an Analog-to-Digital Converter (ADC) pin of the controller 500. A cookware detection current threshold is predetermined in a program of the controller 500. When a current value after analog-to-digital conversion is greater than the predetermined threshold, the controller 500 is set to a cookware flag bit. In this case, it is determined that cookware is on a current heating furnace surface. When the current value after the analog-to-digital conversion is smaller than the predetermined threshold, the cookware flag bit is cleared by the controller 500. In this case, it is determined that no cookware is on the current heating furnace surface. In such manner where it is determined whether there is the cookware through detecting a magnitude of the current flowing through the coil disk, a half-bridge module has power consumption of about forty or fifty watts in the absence of the cookware. The power consumption is borne by the switching transistor, which can easily lead to high loss and poor reliability of the switching transistor.

SUMMARY

The present disclosure aims to solve at least one of the technical problems in the related art. To this end, a first of the present disclosure is to provide a cookware detection circuit using half-bridge drive heating for an electromagnetic heating device, capable of effectively improving reliability of cookware detection while prolonging service life of the electromagnetic heating device.

A second object of the present disclosure is to provide an electromagnetic heating device.

A third object of the present disclosure is to provide a cookware detection method for an electromagnetic heating device.

A fourth object of the present disclosure is to provide a computer-readable storage medium.

A fifth object of the present disclosure is to provide an electromagnetic heating device.

To achieve the embodiments described above, a first aspect of the present disclosure provides a cookware detection circuit using half-bridge drive heating for an electromagnetic heating device. The circuit includes a control module and a pulse detection module. The control module is configured to output a single pulse cookware detection signal to a half-bridge drive module of the electromagnetic heating device to drive a coil disk to perform a resonant operation through the half-bridge drive module. A pulse detection module is connected to the coil disk and is configured to detect a resonant current of the coil disk and generate pulse signals based on the resonant current of the coil disk. The control module is connected to the pulse detection module, and is further configured to count the pulse signals and determine whether cookware is placed on the electromagnetic heating device based on the number of the pulse signals.

The cookware detection circuit using half-bridge drive heating in the embodiments of the present disclosure includes the control module and the pulse detection module. The single pulse cookware detection signal is first outputted to the half-bridge drive module of the electromagnetic heating device from the control module to drive the coil disk to perform the resonant operation through the half-bridge drive module. Because the coil disk is connected to the pulse detection module, the pulse detection module can detect the resonant current of the coil disk and generate the pulse signals based on the resonant current of the coil disk. Then the pulse signals are counted by the pulse detection module to determine whether the cookware is placed on the electromagnetic heating device based on the number of the pulse signals. Therefore, the cookware detection circuit using half-bridge drive heating for the electromagnetic heating device can effectively improve the reliability of the cookware detection, and meanwhile prolong the service life of the electromagnetic heating device.

In some examples of the present disclosure, the pulse detection module includes: a current detection unit connected to the coil disk and configured to detect the resonant current of the coil disk to output a cookware detection current signal; a load unit connected to the current detection unit and configured to generate a voltage detection signal based on the cookware detection current signal; and a zero-crossing voltage comparison unit connected to the load unit and configured to output the pulse signals based on the voltage detection signal.

In some examples of the present disclosure, the zero-crossing voltage comparison unit includes a current limiting resistor, a comparator, a forward voltage clamp diode and a reverse voltage clamp diode. An end of the current limiting resistor is connected to an end of the load unit. A positive input end of the comparator is connected to another end of the current limiting resistor, a negative input end of the comparator is connected to another end of the load unit, and an output end of the comparator is connected to the control module. The forward voltage clamp diode has an anode connected to the positive input of the comparator and a cathode connected to the negative input end of the comparator. The reverse voltage clamp diode has an anode connected to the negative input end of the comparator and a cathode connected to the positive input end of the comparator.

In some examples of the present disclosure, the half-bridge drive module includes an upper bridge switching transistor and a lower bridge switching transistor; and the current detection unit includes a current transformer. The current transformer includes a primary coil and a secondary coil. An end of the primary coil is connected to a node between the upper bridge switching transistor and the lower bridge switching transistor, and another end of the primary coil is connected to the coil disk. Two ends of the secondary coil are connected to the load unit.

In some examples of the present disclosure, the load unit includes a first resistor, a second resistor, a first diode and a second diode. An end of the first resistor is connected to one of the two ends of the secondary coil of the current transformer, and another end of the first resistor is connected to the other one of the two ends of the secondary coil of the current transformer. An end of the second resistor is connected to the end of the first resistor. The first diode has an anode connected to the other end of the first resistor and a cathode connected to the other end of the second resistor. The second diode has an anode connected to another end of the second resistor and a cathode connected to the other end of the first resistor.

In some examples of the present disclosure, the second resistor has a resistance much smaller than a resistance of the first resistor.

In some examples of the present disclosure, the single pulse cookware detection signal is outputted from the control module to the half-bridge drive module subsequent to a first predetermined delayed duration, to drive the upper bridge switching transistor or the lower bridge switching transistor to be switched on. The resonant operation is performed by the coil disk in response to switching on the upper bridge switching transistor or the lower bridge switching transistor.

In some examples of the present disclosure, the control module is further configured to determine, when the number of the pulse signals is smaller than a first predetermined value, that the cookware is placed on the electromagnetic heating device.

To achieve the embodiments described above, a second aspect of the present disclosure provides an electromagnetic heating device. The electromagnetic heating device includes the cookware detection circuit using half-bridge drive heating for the electromagnetic heating device according to the embodiments described above.

In the electromagnetic heating device according to the embodiments of the present disclosure, the function of the cookware detection circuit using half-bridge drive heating for the electromagnetic heating device in the embodiments described above can be achieved. Therefore, the reliability of the cookware detection can be effectively improved, and meanwhile the service life of the electromagnetic heating device can be prolonged.

To achieve the embodiments described above, a third aspect of the present disclosure provides a cookware detection method for an electromagnetic heating device. The cookware detection method includes: outputting a single pulse cookware detection signal to a half-bridge drive module of the electromagnetic heating device, to drive a coil disk to perform a resonant operation through the half-bridge drive module; detecting a resonant current of the coil disk through a pulse detection module, and generating pulse signals based on the resonant current of the coil disk; and counting the pulse signals, and determining whether cookware is placed on the electromagnetic heating device based on the number of the pulse signals.

In the cookware detection method according to the embodiments of the present disclosure, the single pulse cookware detection signal is first outputted to the half-bridge drive module of the electromagnetic heating device to drive the coil disk to perform the resonant operation through the half-bridge drive module. Furthermore, the resonant current of the coil disk is detected through the pulse detection module, and then the pulse signals are generated based on the resonant current of the coil disk. Then the pulse signals are counted and it is determined whether the cookware is placed on the electromagnetic heating device based on the number of the pulse signals. Therefore, the cookware detection method for the electromagnetic heating device can effectively improve the reliability of the cookware detection, and meanwhile prolong the service life of the electromagnetic heating device.

In some examples of the present disclosure, the action of determining whether the cookware is placed on the electromagnetic heating device based on the number of the pulse signals includes: determining whether the number of the pulse signals is smaller than a first predetermined value; determining, in response to determining that the number of the pulse signals is smaller than the first predetermined value, that the cookware is placed on the electromagnetic heating device; and determining, in response to determining that the number of the pulse signals is greater than or equal to the first predetermined value, that no cookware is placed on the electromagnetic heating device.

To achieve the embodiments described above, a fourth aspect of the present disclosure provides a computer-readable storage medium. The computer-readable storage medium has stored thereon a cookware detection program for an electromagnetic heating device. The cookware detection program for the electromagnetic heating device, when executed by a processor, implements the cookware detection method for the electromagnetic heating device according to the embodiments described above.

In the computer-readable storage medium according to the embodiments of the present disclosure, the cookware detection program for the electromagnetic heating device is executed by the processor, therefore the reliability of the cookware detection can be effectively improved, and meanwhile the service life of the electromagnetic heating device can be prolonged.

To achieve the embodiments described above, a fifth aspect of the present disclosure provides an electromagnetic heating device. The electromagnetic heating device includes: a memory; a processor; and a cookware detection program for an electromagnetic heating device. The cookware detection program is stored on the memory and is executable on the processor. The cookware detection program, when executed by the processor, implements the cookware detection method for the electromagnetic heating device according to the embodiments described above.

In the electromagnetic heating device according to the embodiments of the present disclosure, the cookware detection program stored on the memory is executed by the processor, therefore the reliability of the cookware detection can be effectively improved, and meanwhile the service life of the electromagnetic heating device can be prolonged.

Additional aspects and advantages of the embodiments of present disclosure will be provided at least in part in the following description, or will become apparent in part from the following description, or can be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
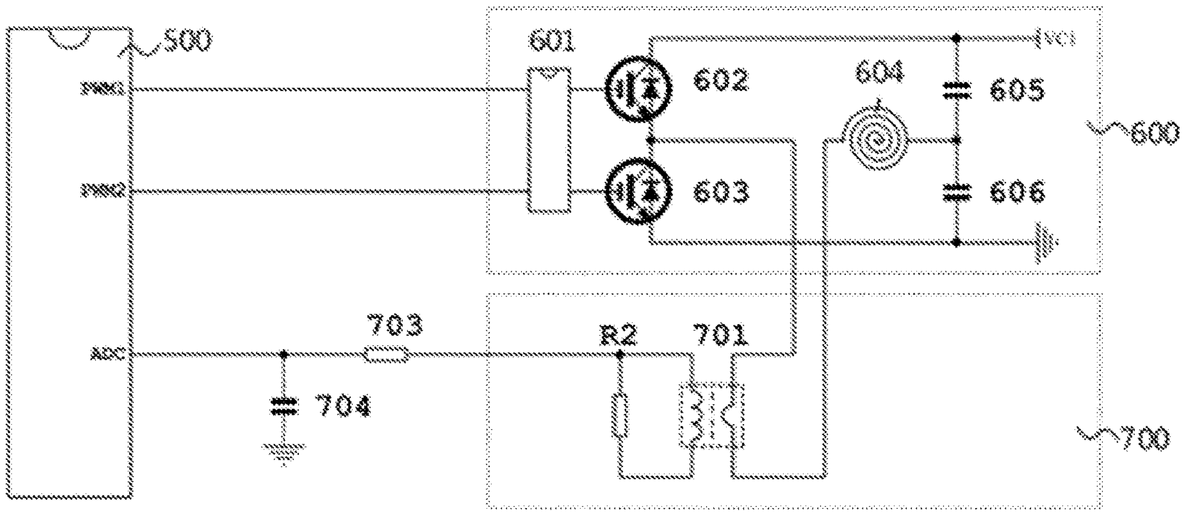
FIG. 1 is a schematic diagram of a cookware detection circuit using half-bridge topology electromagnetic induction heating for an electromagnetic heating device in the related art.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain rather than limit the present disclosure.

A cookware detection circuit using half-bridge drive heating, a heating device, a cookware detection method, and a storage medium according to the embodiments of the present disclosure are described below with reference to the accompanying drawings.

Figure 2:
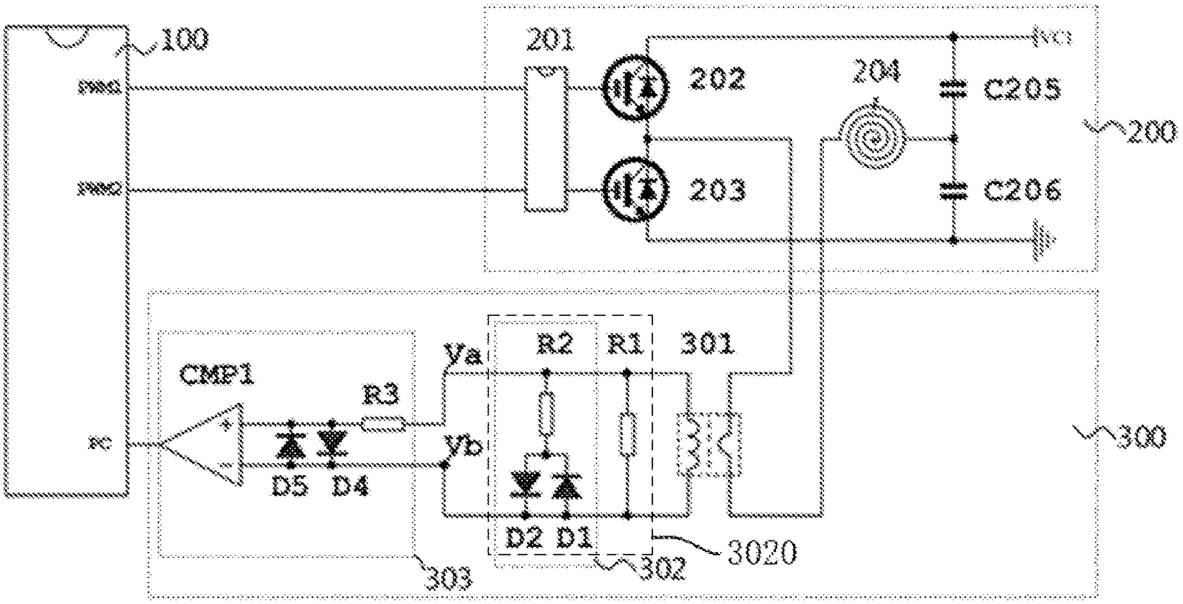
FIG. 2 is a schematic diagram of a cookware detection circuit using half-bridge drive heating for an electromagnetic heating device according to embodiments of the present disclosure.

FIG. 2 is a schematic diagram of a cookware detection circuit using half-bridge drive heating for an electromagnetic heating device according to an embodiment of the present disclosure.

As illustrated in FIG. 2, a cookware detection circuit using half-bridge drive heating of an electromagnetic heating device according to embodiments of the present disclosure includes a control module 100 and a pulse detection module 300.

The control module 100 is configured to output a single pulse cookware detection signal to a half-bridge drive module of the electromagnetic heating device to drive a coil disk to perform a resonance operation through the half-bridge drive module. The pulse detection module 300 is connected to the coil disk, and is configured to detect a resonant current of the coil disk and generate pulse signals based on the resonant current of the coil disk. The control module 100 is connected to the pulse detection module 300, and is further configured to count the pulse signals and determine, whether cookware is placed on the electromagnetic heating device based on the number of the pulse signals.

In one embodiment, referring to FIG. 2, two PWM pins, i.e., PWM1 and PWM2 are disposed on the control module 100 respectively. In this embodiment, the single pulse cookware detection signal is outputted, through PWM2, from the control module 100 to the half-bridge drive module 200 of the electromagnetic heating device, therefore the coil disk 204 in the half-bridge drive module 200 can perform the resonant operation.

Figure 3:
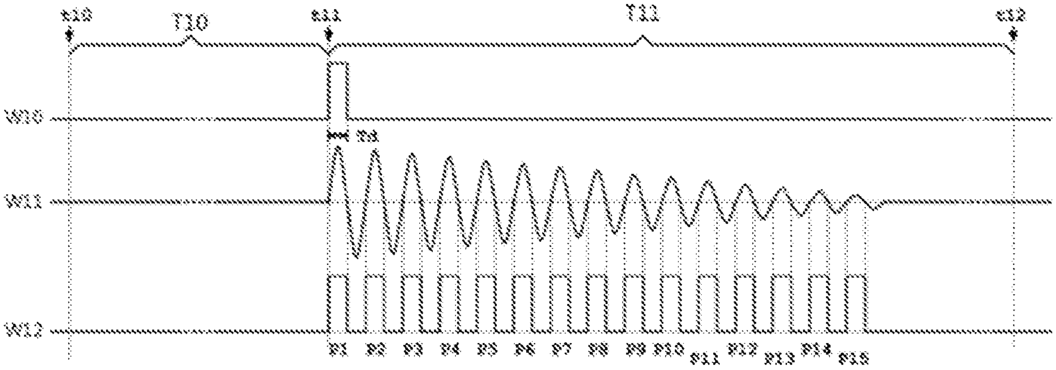
FIG. 3 is a schematic diagram of a cookware detection signal according to an embodiment of the present disclosure.

In one embodiment, as illustrated in FIG. 3, a W10 represents a single pulse cookware detection signal output from the PWM2, and a W11 represents a resonant signal of the coil disk 204. It can be seen from FIG. 3 that, the coil disk 204, driven by the single pulse cookware detection signal, can produce LC resonance with a capacitor 205 and a capacitor 206 to generate a resonant signal. Due to internal resistance consumption, the resonant signal of the coil disk 204 will become weaker and weaker until it disappears.

It can be seen from FIG. 2 that, the pulse detection module 300 is connected to the coil disk 204, and when the resonance signal is generated by the coil disk 204, the pulse detection module 300 can detect the resonant current of the coil disk 204, and generate the pulse signals based on the resonant current of the coil disk 204. A W12 signal as illustrated in FIG. 3 is pulse signals generated by the pulse detection module 300 based on the resonant current of the coil disk 204.

It can be understood that, the pulse detection module 300 can detect the resonant current of the coil disk 204 and generate the pulse signals corresponding to the resonant current, and then the pulse signals are counted through the control module 100 connected to the pulse detection module 300. After the number of the pulse signals is obtained, it is determined whether the cookware is placed on the electromagnetic heating device based on the number of the pulse signals.

In some embodiments of the present disclosure, as illustrated in FIG. 2, the pulse detection module 300 includes a current detection unit 301, a load unit 3020, and a zero-crossing voltage comparison unit 303.

The current detection unit 301 is connected to the coil disk 204, and is configured to detect the resonant current of the coil disk 204 to output a cookware detection current signal. The load unit 3020 is connected to the current detection unit 301, and is configured to generate a voltage detection signal based on the cookware detection current signal. The zero-crossing voltage comparison unit 303 is connected to the load unit 3020, and is configured to output the pulse signals based on the voltage detection signal.

In this embodiment, as illustrated in FIG. 2, the half-bridge drive module 200 includes an upper bridge switching transistor 202 and a lower bridge switching transistor 203. The current detection unit 301 includes a current transformer. An end of the primary coil of the current transformer is connected to a node between the upper bridge switching transistor 202 and the lower bridge switching transistor 203, another end of the primary coil of the current transformer is connected to the coil disk 204, and two ends of the secondary coil of the current transformer are connected to the load unit 3020.

In one embodiment, by setting the current detection unit 301 including the current transformer, through the current transformer, a ten-ampere large current signal flowing through the coil disk 204 can be converted into a small current digital signal of tens of milliamperes, and an effect of signal isolation is achieved. After the small current digital signal is obtained by the current detection unit 301, the signal passes through the load unit 3020 to generate a corresponding voltage detection signal. The voltage detection signal is then compared by passing through the zero-crossing voltage comparison unit 303 to obtain pulse signals corresponding to the voltage detection signal. Furthermore, the pulse signals are obtained by the controller 100.

In some examples, as illustrated in FIG. 2, the load unit 3020 includes a first resistor R1, a second resistor R2, a first diode D1, and a second diode D2.

An end of the first resistor R1 is connected to one of the two ends of the secondary coil of the current transformer, and another end of the first resistor R1 is connected to another of the two ends of the secondary coil of the current transformer. The one end of the second resistor R2 is connected to the one end of the first resistor R1. The first diode D1 has an anode connected to the other end of the first resistor R1 and a cathode connected to the other end of the second resistor R2. The second diode D2 has an anode connected to another end of the second resistor R2 and a cathode connected to the other end of the first resistor R1.

In one embodiment, a combination of the second resistor R2, the first diode D1, and the second diode D2 may serve as a second load unit, and the first resistor R1 may serve as a first load unit. The second resistor R2 has a resistance much smaller than a resistance of the first resistor R1. In one embodiment, a resistance of the first resistor R1 ranges from 50 Ohm to 5000 Ohm, and a resistance of the second resistor ranges from 1 Ohm to 50 Ohm. When the resonance current generated by the coil disk 204 is relatively small, for example, the resonance current is smaller than 1 ampere, the signal is converted into the voltage signal through the first load unit. When the resonance current generated by the coil disk 204 is relatively large, for example, the resonance current is greater than 1 ampere, the signal is converted into the voltage signal through the second load unit.

In some examples of the present disclosure, as illustrated in FIG. 2, the zero-crossing voltage comparison unit 303 includes a current limiting resistor R3, a comparator CMP1, a forward voltage clamping diode D4, and a reverse voltage clamp diode D5.

An end of the current limiting resistor R3 is connected to one end Va of the load unit 3020. A positive input end of the comparator CMP1 is connected to another end of the current limiting resistor R3, a negative input end of the comparator CMP1 is connected to another end Vb of the load unit 3020, and an output end of the comparator CMP1 is connected to the control module 100. The forward voltage clamp diode D4 has an anode connected to the positive input end of the comparator CMP1, and a cathode connected to the negative input end of the comparator CMP1. The reverse voltage clamp diode D5 has an anode connected to the negative input end of the comparator CMP1 and a cathode connected to the positive input end of the comparator CMP1.

In one embodiment, referring to FIG. 2, the zero-crossing voltage comparison unit 303 includes two voltage clamp diodes, i.e., a forward voltage clamp diode D4 and a reverse voltage clamp diode D5, respectively. After the current signal passes through the load unit 3020 and is converted into the voltage signal, the voltage signal may be detected from both ends of the load unit 3020, i.e., the end Va and the end Vb. When a voltage difference between the two ends of the load unit 3020 is greater than a first predetermined voltage, such as 0.7 volts, a voltage of an in-phase input end may be limited to 0.7 volts through the forward voltage clamp diode D4; and when a voltage difference between the two ends of the load unit 3020 is greater than a second predetermined voltage, such as negative 0.7 volts, a voltage of an in-phase input end may be limited to negative 0.7 volts through the reverse voltage clamp diode D5. Thus, the in-phase end of the comparator CMP1 can be protected. When the voltage of the in-phase input end of the comparator CMP1 is higher than that of an antiphase input end, an output of the comparator CMP1 is at a high level; and when the voltage of the in-phase input end of the comparator CMP1 is lower than that of the antiphase input end thereof, an output of the comparator CMP1 is at a low level.

In some embodiments of the present disclosure, as illustrated in FIG. 2, the single pulse cookware detection signal is outputted from the control module 100 to the half-bridge drive module 200 subsequent to a first predetermined delayed duration, to drive the upper bridge switching transistor 202 or the lower bridge switching transistor 203 to be switched on. The resonant operation is performed by the coil disk 204 in response to switching on the upper bridge switching transistor 202 or the lower bridge switching transistor 203.

In one embodiment, referring to FIG. 2 and FIG. 3, in response to no cookware being placed on the coil disk 204, the single pulse cookware detection signal W10 is outputted, subsequent to a first predetermined delayed duration T10, from the control module 100 to the half-bridge drive module 200 at a time point t11 through the PWM 2 pin, to drive the upper bridge switching transistor 202 or the lower bridge switching transistor 203 to be switched on. For example, as illustrated in FIG. 3, the single pulse cookware detection signal W10 is a high-level cookware detection pulse, and a high-level pulse time period is 1 microsecond to 10 microseconds, which is shown as a duration Td in FIG. 3. After the lower bridge switching transistor 203 is switched on for the duration Td, the coil disk 204 produces the LC resonance with the resonant capacitor 205 and the resonant capacitor 206, and the resonant signal is shown as the waveform signal W11 in FIG. 3.

When the coil disk 204 has a positive current, a positive current is also outputted from the current transformer, and then passes through a first current load module R1 or a second current load module 302 to be converted into the voltage signal. In this case, there are positive voltages at a node Va and a node Vb. When the voltages at the node Va and the node Vb exceed the first predetermined voltage, such as 0.7 V, the voltage of the in-phase input end of the comparator CMP1 is clamped to 0.7 V by the diode D4, which has an effect of protecting the in-phase input end. When the voltage of the in-phase input end of the comparator is higher than that of the antiphase input end thereof, an output of the comparator CMP1 is at a high level.

When the coil disk 204 has a negative current, a negative current is also outputted from the current transformer, and then passes through the first current load module R1 or the second current load module 302 to be converted into the voltage signal. In this case, there are positive voltages at the node Va and the node Vb. When the voltages at the node Va and the node Vb exceed the second predetermined voltage, such as 0.7 V, the voltage of the in-phase input end of the comparator CMP1 is clamped to the negative 0.7 V by the diode D4, which has the effect of protecting the in-phase input end. When the voltage of the in-phase input end of the comparator is lower than that of the antiphase input end thereof, an output of the comparator CMP1 is at a low level.

The above description is an operation process of a resonant cycle of the coil disk 204, and the operation process described above is repeated later. Due to no cookware being placed on the coil disk 204, energy of the coil disk 204 in the half-bridge drive module 200 is mainly consumed by the internal resistance of the coil disk 204. The coil disk 204 has a relatively small internal resistance at a few milliohms level, therefore energy loss of the coil disk 204 is small, and the energy is depleted only when the current of the coil disk 204 is reduced to 0 ampere after many resonant cycles. Correspondingly, numbers of pulses are outputted from the comparator CMP 1. As illustrated in FIG. 3, the resonant current of the coil disk 204 is reduced to 0 ampere after 15 cycles, 15 pulse signals are outputted from the comparator CMP1 as shown in a waveform signal W12. In this embodiment, the control module 100 is further configured to determine, when the number of the pulse signals is smaller than a first predetermined value, that the cookware is placed on the electromagnetic heating device. For example, when the first predetermined value is 8, it can be determined that no cookware is placed on the electromagnetic device when the number of the pulse signals is smaller than the first predetermined value.

Figure 4:
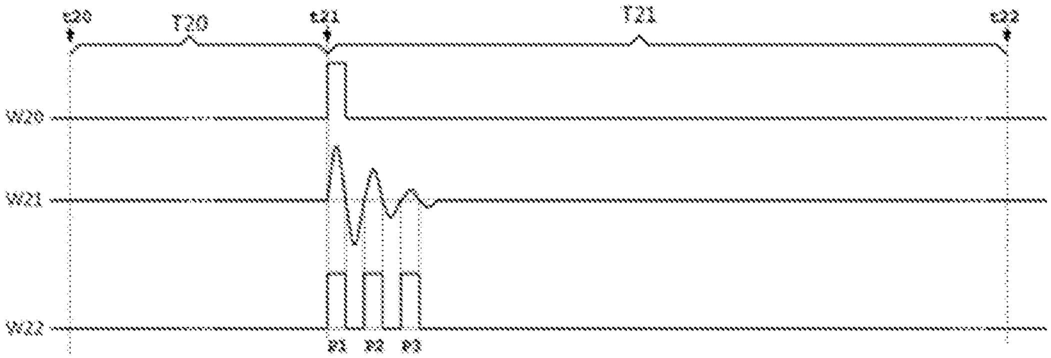
FIG. 4 is a schematic diagram of a cookware detection signal according to another embodiment of the present disclosure.

When the cookware is placed on the coil disk 204, as illustrated in FIG. 2 and FIG. 4, W20 represents a waveform signal of a PWM2 pin outputted from the control module 100, W21 represents a current waveform of the coil disk 204, and W22 represents a pulse waveform outputted from the zero-crossing voltage comparison unit 303. A specific operation process may refer to the above-mentioned embodiments where no cookware is placed. In contrast, since the cookware is placed on the coil disk 204, the energy of the coil disk 204 is mainly consumed by the cookware. Moreover, an equivalent resistance of the cookware is at a few ohms level much larger than the internal resistance of the coil disk 204 at a few milliohms level, therefore the current of the coil disk 204 can be reduced to 0 ampere only after several resonant cycles to deplete the energy. Correspondingly, small numbers of pulses are outputted from the comparator CMP 1. As illustrated in FIG. 4, the resonant current of the coil disk 204 is reduced to 0 ampere after 3 cycles in the waveform W21, and three pulses are outputted from the comparator CMP 1 as shown in the waveform signal W22. In this embodiment, the control module 100 is further configured to determine, when the number of the pulse signals is smaller than a first predetermined value, that the cookware is placed on the electromagnetic heating device. For example, when the first predetermined value is 8, it can be determined that the cookware is placed on the electromagnetic device when the number of the pulse signals is smaller than the first predetermined value.

In one embodiment, during cookware detection, whether a current cookware flag bit is zero or not can be first judged through the controller. When the current cookware flag bit is zero, an operation of cookware detection can be performed through the embodiments described above. In response to determining that the cookware is placed on the electromagnetic heating device through the embodiments described above, the current cookware flag bit is 1. In response to determining by the controller that the current cookware flag bit is not zero, it is identified that the cookware is placed on the current electromagnetic heating device.

To sum up, in the cookware detection circuit using half-bridge drive heating for the electromagnetic heating device according to the embodiments described above, during the cookware detection, the controller can only output a short pulse with a pulse width of about 1 microsecond to 10 microseconds to the PWM2, and energy from a position of a power supply supplying power is obtained by the lower bridge switching transistor during the time period. Then the coil disk resonates with the resonant capacitor, and the resonant cycle is obtained through the number of pulses output from the zero-crossing voltage comparison unit 303 to realize the cookware detection. Therefore, the switching transistor in the cookware detection circuit using half-bridge drive heating is only switched on for a very short duration, the upper bridge switching transistor is not switched on. Therefore, the switching transistor loss of the cookware detection circuit using half-bridge drive heating during the cookware detection is greatly reduced. In this way, the reliability of the cookware detection can be effectively improved, and meanwhile the service life of the electromagnetic heating device is prolonged.

Further, the present disclosure provides an electromagnetic heating device. The electromagnetic heating device includes the cookware detection circuit using half-bridge drive heating for the electromagnetic heating device according to the embodiments described above.

In the electromagnetic heating device according to the embodiments of the present disclosure, the function of the cookware detection circuit using half-bridge drive heating for the electromagnetic heating device in the embodiments described above can be achieved. Therefore, the reliability of the cookware detection can be effectively improved, and meanwhile the service life of the electromagnetic heating device can be prolonged.

Figure 5:
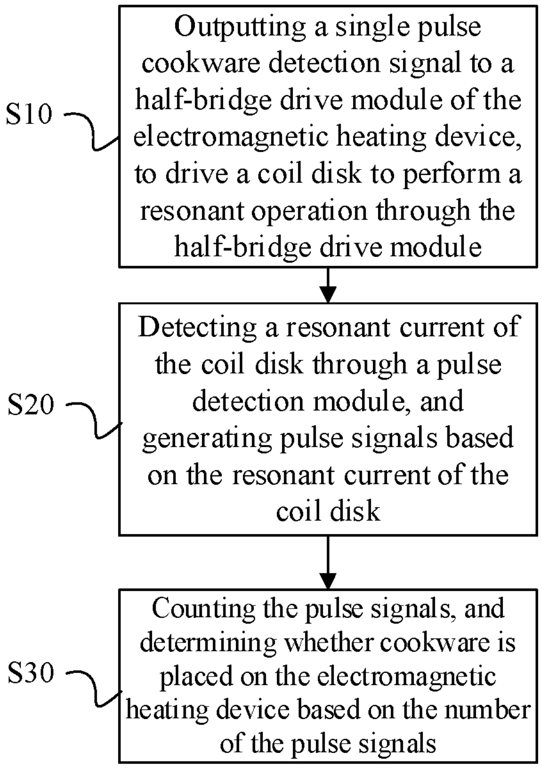
FIG. 5 is a flowchart of a cookware detection method for an electromagnetic heating device according to embodiments of the present disclosure.

FIG. 5 is a flowchart of a cookware detection method for an electromagnetic heating device according to embodiments of the present disclosure.

Further, the present disclosure provides a cookware detection method for an electromagnetic heating device. As illustrated in FIG. 5, the cookware detection method in this embodiment includes the following steps: step S10, outputting a single pulse cookware detection signal to a half-bridge drive module of the electromagnetic heating device, to drive a coil disk to perform a resonant operation through the half-bridge drive module; step S20, detecting a resonant current of the coil disk through a pulse detection module, and generating pulse signals based on the resonant current of the coil disk; and step S30, counting the pulse signals, and determining whether cookware is placed on the electromagnetic heating device based on the number of the pulse signals.

In one embodiment, referring to FIG. 2 and FIG. 5, two PWM pins, i.e., PWM1 and PWM2 are disposed on the control module 100 respectively. In this embodiment, the single pulse cookware detection signal is outputted, through the pin PWM2, to the half-bridge drive module 200 of the electromagnetic heating device from the control module 100, therefore the coil disk 204 in the half-bridge drive module 200 can perform the resonant operation.

In one embodiment, as illustrated in FIG. 3, a W10 represents a single pulse cookware detection signal outputted from the PWM2, and a W11 represents a resonant signal of the coil disk 204. It can be seen from FIG. 3 that, the coil disk 204, driven by the single pulse cookware detection signal, can produce LC resonance with a capacitor 205 and a capacitor 206 to generate a resonant signal. Due to internal resistance consumption, the resonant signal of the coil disk 204 will become weaker and weaker until it disappears.

It can be seen from FIG. 2 that, the pulse detection module 300 is connected to the coil disk 204, and when the resonance signal is generated by the coil disk 204, the pulse detection module 300 can detect the resonant current of the coil disk 204, and generate the pulse signals based on the resonant current of the coil disk 204. A signal W12 as illustrated in FIG. 3 is pulse signals generated by the pulse detection module 300 based on the resonant current of the coil disk 204.

It can be understood that, the pulse detection module 300 can detect the resonant current of the coil disk 204 and generate the pulse signals corresponding to the resonant current, and then the pulse signals are counted by using the control module 100 connected to the pulse detection module 300. After the number of the pulse signals is obtained, it is determined whether cookware is placed on the electromagnetic heating device based on the number of the pulse signals.

In some examples of the present disclosure, the action of determining whether the cookware is placed on the electromagnetic heating device based on the number of the pulse signals includes: determining whether the number of the pulse signals is smaller than a first predetermined value; determining, in response to determining that the number of the pulse signals is smaller than the first predetermined value, that the cookware is placed on the electromagnetic heating device; and determining, in response to determining that the number of the pulse signals is greater than or equal to the first predetermined value, that no cookware is placed on the electromagnetic heating device.

It should be noted that, other specific implementations of the cookware detection method for the electromagnetic heating device according to the embodiments of the present disclosure may refer to the specific embodiments of the implementation method of the cookware detection circuit using half-bridge drive heating for the electromagnetic heating device in the embodiments described above.

To sum up, in the cookware detection method for the electromagnetic heating device according to the embodiments described above, during the cookware detection, the controller can only output a short pulse with a pulse width of about 1 microsecond to 10 microseconds to the PWM2, and energy from a position of a power supply supplying power is obtained by the lower bridge switching transistor during the time period. Then the coil disk resonates with the resonant capacitor, and the resonant cycle is obtained through the number of pulses output from the zero-crossing voltage comparison unit 303 to realize the cookware detection. Therefore, the switching transistor in the cookware detection circuit using half-bridge drive heating is only switched on for a very short duration, the upper bridge switching transistor is not switched on, and thus the switching transistor loss of the cookware detection circuit using half-bridge drive heating during the cookware detection is greatly reduced. In this way, the reliability of the cookware detection can be effectively improved, and meanwhile the service life of the electromagnetic heating device is prolonged.

Further, the present disclosure provides a computer-readable storage medium. The computer-readable storage medium has stored thereon a cookware detection program for an electromagnetic heating device. The cookware detection program for the electromagnetic heating device, when executed by a processor, implements the cookware detection method for the electromagnetic heating device according to the embodiments described above.

In the computer-readable storage medium according to the embodiments of the present disclosure, the cookware detection program for the electromagnetic heating device is executed by the processor, therefore the reliability of the cookware detection can be effectively improved, and meanwhile the service life of the electromagnetic heating device can be prolonged.

Further, the present disclosure provides an electromagnetic heating device. The electromagnetic heating device includes: a memory; a processor; and a cookware detection program for an electromagnetic heating device. The cookware detection program is stored on the memory and executable on the processor. The cookware detection program, when executed by the processor, implements the cookware detection method for the electromagnetic heating device according to the embodiments described above.

In the electromagnetic heating device according to the embodiments of the present disclosure, the cookware detection program for the electromagnetic heating device stored on the memory is executed by the processor, therefore the reliability of the cookware detection can be effectively improved, and meanwhile the service life of the electromagnetic heating device can be prolonged.

The embodiments of the present disclosure are described in detail above with reference to the accompanying drawings, but the present disclosure is not limited to the above embodiments, and various changes may also be made within the scope of knowledge possessed by those skilled in the art and without departing from the spirit of the present disclosure.

What is claimed is:

1. A cookware detection circuit comprising:

a control module configured to output a single pulse cookware detection signal to a half-bridge drive module of an electromagnetic heating device to drive a coil disk of the electromagnetic heating device to perform a resonant operation through the half-bridge drive module; and a pulse detection module configured to be connected to the coil disk and detect a resonant current of the coil disk and generate one or more pulse signals based on the resonant current of the coil disk;

wherein:

the control module is connected to the pulse detection module, and is further configured to count the one or more pulse signals and determine whether cookware is placed on the electromagnetic heating device based on a number of the one or more pulse signals;

the half-bridge drive module includes an upper bridge switching transistor and a lower bridge switching transistor; and the pulse detection module includes:

a load unit; and a current transformer including:

a primary coil, an end of the primary coil being connected to a node between the upper bridge switching transistor and the lower bridge switching transistor, and another end of the primary coil being connected to the coil disk; and a secondary coil, two ends of the secondary coil being connected to the load unit.

2. The cookware detection circuit according to claim 1, wherein the pulse detection module further includes:

a current detection unit connected to the coil disk and configured to detect the resonant current of the coil disk to output a cookware detection current signal wherein the load unit is connected to the current detection unit and configured to generate a voltage detection signal based on the cookware detection current signal; and a zero-crossing voltage comparison unit connected to the load unit and configured to output the one or more pulse signals based on the voltage detection signal.

3. The cookware detection circuit according to claim 2, wherein the zero-crossing voltage comparison unit includes:

a current limiting resistor, an end of the current limiting resistor being connected to an end of the load unit;

a comparator, a positive input end of the comparator being connected to another end of the current limiting resistor, a negative input end of the comparator being connected to another end of the load unit, and an output end of the comparator being connected to the control module;

a forward voltage clamp diode having an anode connected to the positive input of the comparator and a cathode connected to the negative input end of the comparator; and a reverse voltage clamp diode having an anode connected to the negative input end of the comparator and a cathode connected to the positive input end of the comparator.

4. The cookware detection circuit according to claim 1, wherein the load unit includes:

a first resistor, an end of the first resistor being connected to one of the two ends of the secondary coil of the current transformer, and another end of the first resistor being connected to another of the two ends of the secondary coil of the current transformer;

a second resistor, an end of the second resistor being connected to the end of the first resistor;

a first diode having an anode connected to the other end of the first resistor and a cathode connected to another end of the second resistor; and a second diode having an anode connected to the other end of the second resistor and a cathode connected to the other end of the first resistor.

5. The cookware detection circuit according to claim 4, wherein a resistance of the second resistor is smaller than a resistance of the first resistor.

6. The cookware detection circuit according to claim 5, wherein the resistance of the second resistor is 1% to 2% of the resistance of the first resistor.

7. The cookware detection circuit according to claim 1, wherein the control module is configured to output the single pulse cookware detection signal to the half-bridge drive module with a delay to turn on the upper bridge switching transistor or the lower bridge switching transistor, to enable the coil disk to perform the resonant operation.

8. The cookware detection circuit according to claim 1, wherein the control module is further configured to determine, in response to the number of the one or more pulse signals is smaller than a predetermined value, that the cookware is placed on the electromagnetic heating device.

9. An electromagnetic heating device comprising:

a half-bridge drive module;

a coil disk; and the cookware detection circuit according to claim 1.

10. The electromagnetic heating device according to claim 9, wherein the pulse detection module further includes:

a current detection unit connected to the coil disk and configured to detect the resonant current of the coil disk to output a cookware detection current signal wherein the load unit is connected to the current detection unit and configured to generate a voltage detection signal based on the cookware detection current signal; and a zero-crossing voltage comparison unit connected to the load unit and configured to output the one or more pulse signals based on the voltage detection signal.

11. The electromagnetic heating device according to claim 10, wherein the zero-crossing voltage comparison unit includes:

a current limiting resistor, an end of the current limiting resistor being connected to an end of the load unit;

a comparator, a positive input end of the comparator being connected to another end of the current limiting resistor, a negative input end of the comparator being connected to another end of the load unit, and an output end of the comparator being connected to the control module;

a forward voltage clamp diode having an anode connected to the positive input of the comparator and a cathode connected to the negative input end of the comparator; and a reverse voltage clamp diode having an anode connected to the negative input end of the comparator and a cathode connected to the positive input end of the comparator.

12. The cookware detection circuit according to claim 9, wherein the load unit includes:

a first resistor, an end of the first resistor being connected to one of the two ends of the secondary coil of the current transformer, and another end of the first resistor being connected to another of the two ends of the secondary coil of the current transformer;

a second resistor, an end of the second resistor being connected to the end of the first resistor;

a first diode having an anode connected to the other end of the first resistor and a cathode connected to another end of the second resistor; and a second diode having an anode connected to the other end of the second resistor and a cathode connected to the other end of the first resistor.

13. The cookware detection circuit according to claim 12, wherein a resistance of the second resistor is smaller than a resistance of the first resistor.

14. The cookware detection circuit according to claim 9, wherein the control module is configured to output the single pulse cookware detection signal to the half-bridge drive module with a delay to turn on the upper bridge switching transistor or the lower bridge switching transistor, to enable the coil disk to perform the resonant operation.

15. A cookware detection method comprising:

outputting a single pulse cookware detection signal to a half-bridge drive module of an electromagnetic heating device, to drive a coil disk of the electromagnetic heating device to perform a resonant operation through the half-bridge drive module;

detecting a resonant current of the coil disk through a pulse detection module, and generating one or more pulse signals based on the resonant current of the coil disk; and counting the one or more pulse signals, and determining whether cookware is placed on the electromagnetic heating device based on a number of the one or more pulse signals;

wherein:

the half-bridge drive module includes an upper bridge switching transistor and a lower bridge switching transistor; and the pulse detection module includes:

a load unit; and a current transformer including:

a primary coil, an end of the primary coil being connected to a node between the upper bridge switching transistor and the lower bridge switching transistor, and another end of the primary coil being connected to the coil disk; and a secondary coil, two ends of the secondary coil being connected to the load unit.

16. The cookware detection method according to claim 15, wherein determining whether the cookware is placed on the electromagnetic heating device based on the number of the one or more pulse signals includes:

determining whether the number of the one or more pulse signals is smaller than a predetermined value;

determining, in response to determining that the number of the one or more pulse signals is smaller than the predetermined value, that the cookware is placed on the electromagnetic heating device; and determining, in response to determining that the number of the one or more pulse signals is greater than or equal to the predetermined value, that no cookware is placed on the electromagnetic heating device.

17. A computer-readable storage medium storing a cookware detection program that, when executed by a processor, cause the processor to implement the cookware detection method according to claim 15.

18. An electromagnetic heating device comprising:

a memory storing a cookware detection program; and a processor configured to execute the cookware detection program to implement the cookware detection method according to claim 15.

19. A cookware detection circuit comprising:

a control module configured to output a single pulse cookware detection signal to a half-bridge drive module of an electromagnetic heating device to drive a coil disk of the electromagnetic heating device to perform a resonant operation through the half-bridge drive module; and a pulse detection module configured to be connected to the coil disk and detect a resonant current of the coil disk and generate one or more pulse signals based on the resonant current of the coil disk;

wherein:

the control module is connected to the pulse detection module, and is further configured to count the one or more pulse signals and determine whether cookware is placed on the electromagnetic heating device based on a number of the one or more pulse signals;

the pulse detection module includes:

a current detection unit connected to the coil disk and configured to detect the resonant current of the coil disk to output a cookware detection current signal;

a load unit connected to the current detection unit and configured to generate a voltage detection signal based on the cookware detection current signal; and a zero-crossing voltage comparison unit connected to the load unit, configured to output the one or more pulse signals based on the voltage detection signal, and including:

a current limiting resistor, an end of the current limiting resistor being connected to an end of the load unit;

a comparator, a positive input end of the comparator being connected to another end of the current limiting resistor, a negative input end of the comparator being connected to another end of the load unit, and an output end of the comparator being connected to the control module;

a forward voltage clamp diode having an anode connected to the positive input of the comparator and a cathode connected to the negative input end of the comparator; and a reverse voltage clamp diode having an anode connected to the negative input end of the comparator and a cathode connected to the positive input end of the comparator.

* * * * *